United States Patent
Algüera Gallego et al.

(10) Patent No.: US 8,187,020 B2
(45) Date of Patent: May 29, 2012

(54) PLUG-IN SYSTEM FOR TRAILER VEHICLES

(75) Inventors: José Manuel Algüera Gallego, Aschaffenburg (DE); Michael Eiermann, Pfungstadt (DE); Steffen Haber, Groβ-Gerau (DE)

(73) Assignee: Jost-Werke GmbH, Neu-Isenberg (DE)

( * ) Notice: Subject to any disclaimer, the term of this patent is extended or adjusted under 35 U.S.C. 154(b) by 0 days.

(21) Appl. No.: 12/921,924

(22) PCT Filed: Mar. 12, 2009

(86) PCT No.: PCT/EP2009/052937
§ 371 (c)(1),
(2), (4) Date: Sep. 10, 2010

(87) PCT Pub. No.: WO2009/112553
PCT Pub. Date: Sep. 17, 2009

(65) Prior Publication Data
US 2011/0008992 A1    Jan. 13, 2011

(30) Foreign Application Priority Data
Mar. 12, 2008 (DE) .......................... 10 2008 014 285

(51) Int. Cl.
*H01R 13/64* (2006.01)

(52) U.S. Cl. ..................................................... 439/378
(58) Field of Classification Search .................. 439/248, 439/241, 378, 381; 280/421, 420
See application file for complete search history.

(56) References Cited

U.S. PATENT DOCUMENTS

| | | | | |
|---|---|---|---|---|
| 4,738,463 | A | 4/1988 | Poore et al. | 280/421 |
| 4,998,892 | A * | 3/1991 | Shiley | 439/381 |
| 5,514,000 | A * | 5/1996 | Krause et al. | 439/248 |
| 5,605,150 | A * | 2/1997 | Radons et al. | 600/300 |
| 6,754,067 | B2 * | 6/2004 | Turner et al. | 361/659 |
| 7,464,967 | B2 | 12/2008 | Mieger et al. | 285/124.5 |
| 7,793,966 | B2 | 9/2010 | Richter et al. | 280/433 |
| 2006/0022455 | A1 | 2/2006 | Mieger et al. | 285/124.5 |
| 2006/0249927 | A1 | 11/2006 | Metternich et al. | 280/515 |
| 2009/0008903 | A1 | 1/2009 | Richter et al. | 280/420 |

FOREIGN PATENT DOCUMENTS

DE         10159417 A1         9/2002
(Continued)

OTHER PUBLICATIONS

International Preliminary Report on Patentability issued Oct. 14, 2010, in International Application No. PCT/EP2009/052937, 10 pages.

*Primary Examiner* — Alexander Gilman
(74) *Attorney, Agent, or Firm* — Brinks Hofer Gilson & Lione

(57) ABSTRACT

A plug-in system for trailer vehicles provided with an automatic coupling system of the supply lines, including a plug (1) supporting the line contacts (1a) and a socket (2). The plug (1) has guide elements (4) that actively engage when approaching the guide elements (5) of the socket (2). The centering of a plug system for an automatic coupling system of supply lines on an articulated train is achieved by the guide elements (4) include a main guide pin (6) and at least one centering pin (7a, 7b) arranged at a distance therefrom. At least the centering pin (7a, 7b) and/or the associated guide element (5, 9) is elastic in the radial direction.

18 Claims, 2 Drawing Sheets

FOREIGN PATENT DOCUMENTS

| | | |
|---|---|---|
| DE | 102004024333 A1 | 12/2005 |
| EP | 1624116 A2 | 2/2006 |
| EP | 1900620 A1 | 3/2008 |
| FR | 1479487 | 5/1967 |
| WO | WO 01/60645 A1 | 8/2001 |
| WO | WO 2005/028220 A1 | 3/2005 |

* cited by examiner

PLUG-IN SYSTEM FOR TRAILER VEHICLES

BACKGROUND

The invention relates to a plug-in system for trailer vehicles provided with an automatic coupling system of the supply lines, comprising a plug supporting the line contacts and a socket, wherein the socket comprises guide elements that actively engage when approaching the guide elements of the socket. Moreover, the invention is implemented on a plug half.

Supply lines are to be understood as electrically conductive cable connections as well as pneumatic lines and, if applicable, hydraulic lines. The trailer vehicles can be, for example, articulated trains or articulated road trains.

The articulated train usually consists of a tractor vehicle and a semitrailer coupled thereto. For this, the tractor vehicle carries a fifth wheel into which a king pin arranged on the lower side of the semitrailer is inserted and subsequently locked. For coupling the semitrailer, the fifth wheel plate is usually formed with an insertion opening which extends in a wedge-shaped manner in the driving direction and which has a free installation space with at least an installation space depth that ensures that the king pin can move in and out. When coupling, the semitrailer slides over the upper side of the fifth wheel, wherein the lateral guidance is ensured through the king pin which is positively guided during coupling until it has reached its locking position in the insertion opening.

DE 2004 024 333 A1 discloses a generic plug-in system with a pivot wedge which is mounted pivotable about the king pin and on the lower side of which a plug is arranged which is inserted during the mechanical coupling process of tractor vehicle and semitrailer into the connector socket on the tractor vehicle side. In order that both plug halves meet each other during the coupling process, partially cylindrical and conically extending guide elements are arranged on the plug, which guide elements are caught by the socket's guide arms extending rearwards and are positively guided on the same until the final contact position is reached. The essential disadvantage of this system is the tolerance compensation and the centering of the two plug halves because at one of the two guide arms, a very precise alignment of the plug halves to each other takes place and the tolerances add up at the second guide arm. This, in turn, leads to significant wear in case of frequent coupling processes and a safety risk resulting therefrom.

Therefore, the invention is based on the object to improve a plug-in system, in particular a plug half, for an automatic coupling system of supply lines with respect to its centering during the coupling process.

SUMMARY

Said object is solved according to the invention with a plug-in system in which the guide elements comprise a main guide pin and at least one centering pin spaced apart therefrom, wherein at least the centering pin and/or the associated guide element is elastic in radial direction.

In the plugged state, the main guide pin has the positive property to keep potentially occurring compressive forces away from the line contacts. As a result, the range of movement is limited by the main guide pin to two degrees of freedom.

An elastic centering pin is to be understood as the elasticity of the centering pin itself and also as an elastic mounting of centering pin which is bending resistant per se. By means of the elastic properties of the centering pin, tolerances in the plugged state between the plug and the socket are compensated by an adequate deformation of the centering pin.

For this, the main guide pin should be arranged centered on the front side of the plug or the socket. The at least one centering pin extends in this case laterally offset and axially parallel to the main guide pin and also projects on the front side of the respective plug half.

Advantageously, two centering pins arranged on both sides of the main guide pin are provided. The main guide pin should be arranged centered between the centering pins. Due to the arrangement of two centering pins, the tolerances are distributed approximately equally on the respective side of the main guide pin, whereby a particularly precise sliding of plug into socket is possible.

It has been found to be advantageous if the main guide pin and the at least one centering pin are dedicated to the plug. This results in the advantage that the current-conducting socket, which usually is arranged on the tractor vehicle, is arranged without projecting components in an area which is difficult to access below the insertion opening of the fifth wheel, and the projecting main guide and centering pins are in an area which is easily accessible on the lower side of the semitrailer.

Preferably, the guide elements of the socket are configured as receiving openings.

According to a further advantageous embodiment, the receiving opening provided for receiving the main guide pin has an inner diameter which is complementary to the outer diameter of the main guide pin. For manufacturing reasons, the receiving opening for the main guide pin should be a bore hole with a circular cross-section. Preferably, in this case, the main guide pin has a cylindrical cross-section.

Also, the receiving opening provided for receiving the at least one centering pin can be formed with an inner diameter which is complementary to the outer diameter of the at least one centering pin. If two centering pins are used, also such embodiments are possible in which the inner diameter of the receiving opening is larger than the outer diameter of the centering pins and, for example, can also comprise a recess of the outer housing contour. A prerequisite for this is that the receiving opening is arranged on the socket on both sides above or below the centering pins. In such embodiments, the diameter tolerances of the centering pins do not play a role.

The front section of the centering pin is preferably formed in a drop shape or a spherical shape which, during a position change of a resiliently mounted centering pin allows a tilting movement in the radial direction within the recess of the socket. This is possible in particular for rounded shapes which cause a line contact with the inner wall of the receiving opening instead of a surface contact.

Advantageously, the receiving opening has a breakout to the respective nearest lateral wall face. This allows a particularly advantageous lateral deflection of the centering pin. If two centering pins are available, they travel in opposite directions thereby generating an opposing reset force which retains the plug in the socket and centered to the main guide pin.

According to an alternative configuration, the receiving openings of the two centering pins are each formed from recesses of the socket with a straight horizontal wall section, which recesses are each formed on the upper and/or lower side of the socket. Here, the centering pins are supported from outside on a correspondingly formed housing contour of the respective plug half. These recesses too can open out into the lateral wall faces.

Advantageously, the plug and the socket are made of plastic. The plastic itself is electrically insulating so that no additional measures for insulating the electrical line contacts are necessary. Moreover, the plug and the socket can be produced from plastic in a cost-effective manner, wherein other materials can be combined with the plastic without any problems. Due to the good processability, for example, the flow channels for the compressed air supply can be incorporated in a simple manner in the plastic which, in addition, does not corrode.

However, to ensure the necessary wear resistance, the main guide pin and the at least one centering pin should be made of metal.

It is also found to be advantageous if the main guide pin and the at least one centering pin extend in axial direction throughout the entire length of the plug. Preferably, the main guide pin and the at least one centering pin are attached to the rear bottom wall. Advantageously, the at least one centering pin is surrounded within the plug by an annular space which opens out at the front side and is supported with an elastic element just before the exit out of the annular space on the wall of the same. This embodiment allows a tumbling movement about the axial extension of the centering pin within the plug, which movement is only limited by the elastic element which is also arranged in the annular space.

As elastic element, for example, an O-ring can be used.

As an alternative to this it is also possible to make the at least one centering pin itself from an elastic material and to insert it into the plug in a precisely fitting manner.

Advantageously, the main guide pin protrudes further with respect to the front side than the at least one centering pin. This design allows, during coupling, a first approximate alignment of the two plug halves to one another through a first engagement of the main guide pin in the guide elements of the other plug half provided for this purpose. Only during a further spatial approach of plug and socket, the at least one centering pin is brought in engagement and provides for a precise alignment, wherein the main guide pin remains actively engaged with the other plug half during the duration of the approach.

Advantageously, the plug is arranged on a pivot part which is formed complementary to the insertion opening of a fifth wheel. This embodiment can be used for generic plug-in coupling systems for articulated trains.

The invention is also implemented on a first plug half having guide elements formed thereon, which guide elements engage actively with guide elements of a second plug half when approaching them, wherein the guide elements comprise a main guide pin and at least one centering pin laterally spaced apart thereto. According to the invention, the at least one centering pin is elastic in the radial direction.

BRIEF DESCRIPTION OF THE DRAWINGS

For a better understand, the invention is explained hereinafter in more detail by means of a total of three figures. In the figures.

DESCRIPTION OF PREFERRED EMBODIMENTS

Figure 1:
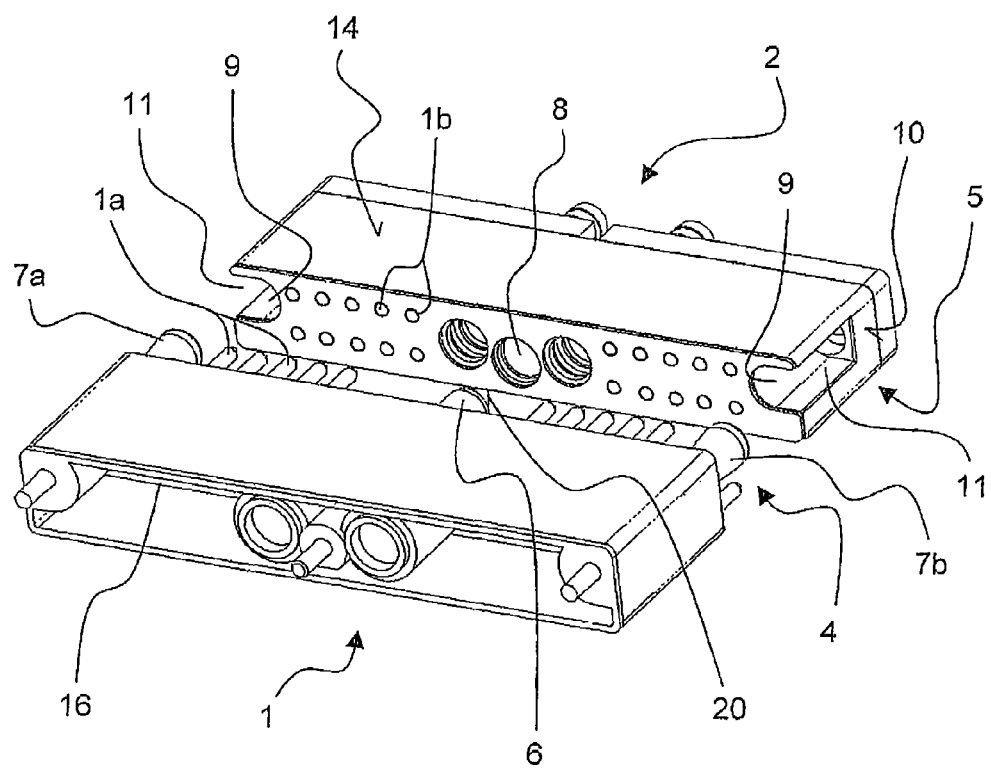
FIG. 1: shows a perspective view onto a plug and a socket.

FIG. 1 shows a perspective view on a plug 1 according to the invention as first plug half with an associated socket 2 as second plug half.

The plug 1 has a box-like shape and is equipped on its front side 17 (see FIG. 2) facing towards the socket 2 with protruding line contacts 1a. The line contacts 1a are grouped on both sides around a centrically arranged main guide pin 6. The main guide pin 6 is cylindrically shaped and, when the plug 1 approaches the socket 2, slides into an opposing receiving opening 8 of the socket 2. This penetration of the main guide pin 6 into the receiving opening 8 complementarily provided as bore hole is facilitated by a conically extending tip 20 arranged on the end side of the main guide pin 6.

On each side in the outer lateral peripheral areas of plug 1, one centering pin 7a, 7b, respectively, is shown. The line contacts 1a of the plug 1 are located on each side of the main guide pin 6 between the main guide pin 6 and the respective centering pin 7a, 7b.

The main centering pin 6 and the centering pin 7a, 7b form the guide elements 4 of the plug 1.

The socket 2 has two receiving openings 9 for a positive reception of the centering pins 7a, 7b. The receiving openings 9 both open out via a breakout 11 into the associated lateral wall face 10. Moreover, also on the plug's 1 side facing the socket 2, line contacts 1b are arranged which, in the provided alignment of the plug halves 1, 2 are exactly opposite to the line contacts 1a and receive the same.

The receiving openings 8, 9 form the guide elements 5 of the socket 5.

Figure 2:
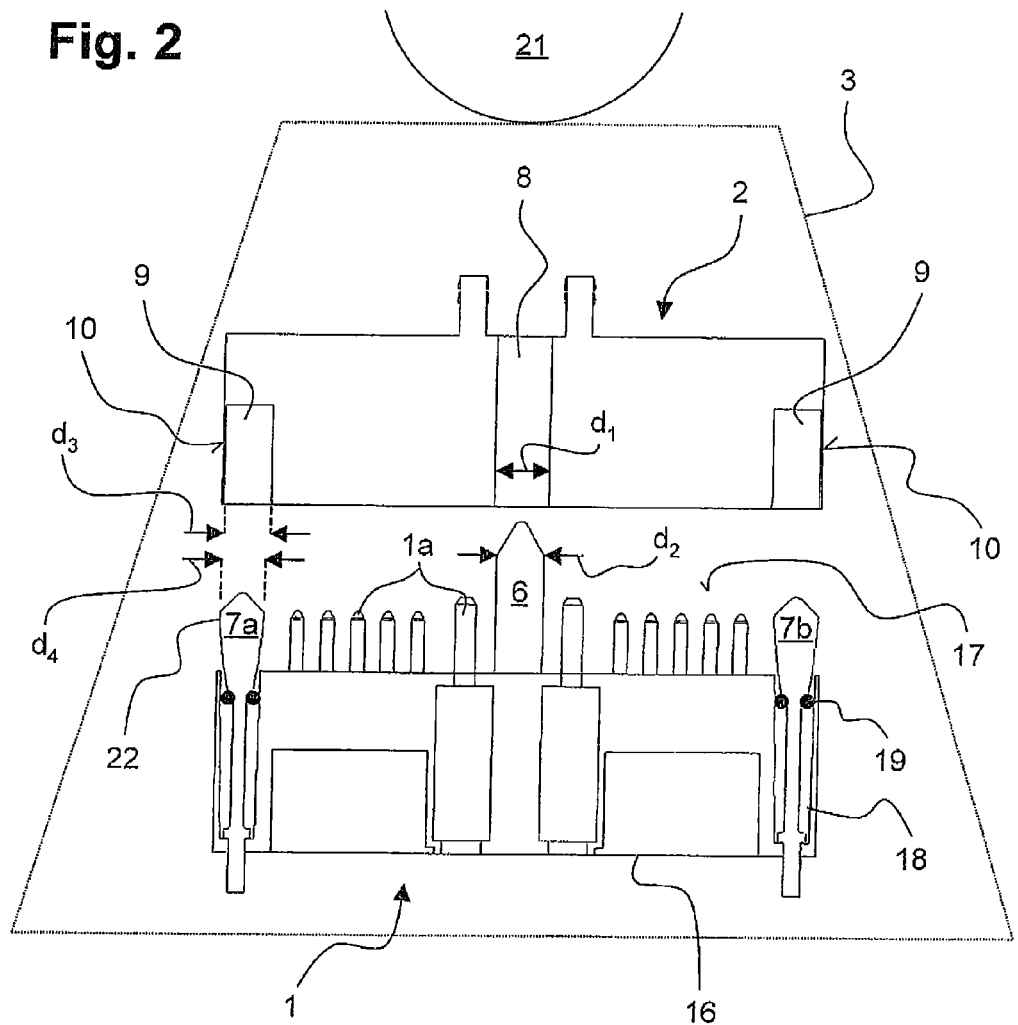
FIG. 2 shows a horizontal cross-section through the plug and the socket according to FIG. 1, and FIG. 3: shows a front view on a socket according to an alternative embodiment.

FIG. 2 shows a horizontal cross-section through the plug 1 and the socket 2. Additionally illustrated is a pivot wedge 3 arranged thereabove, on the lower side of which the plug 1 engages. The pivot wedge 3, in turn, is mounted pivotably about a king pin 21 (partially illustrated), preferably by mounting directly on the king pin 21. The dimensions of the pivot wedge 3 correspond to the wedge-shaped geometry of the insertion opening of a fifth wheel, which is not shown in detail, so that the pivot wedge 3 is laterally fixed through the fifth wheel when the semitrailer is coupled.

The cross-section through the plug 1 according to FIG. 2 clearly shows the arrangement of the two outer centering pins 7a, 7b with respect to the main guide pin 6 arranged centrally therebetween. Extending from the front side 17 of the plug 1, the main guide pin 6 protrudes further in the direction to the socket 2 than the centering pins 7a, 7b. When the socket 2 continues to approach the plug 1, the main guide pin 6 penetrates first into the receiving opening 8. Only when this first guidance takes place, the set-back centering pins 7a, 7b engage actively with receiving opening 9 provided for this purpose. This results in a pre-alignment by the main guide pin 6 and a subsequent fine adjustment by the two centering pins 7a, 7b.

The main guide pin 6 has a cylindrical outer circumferential surface which, during sliding in the preferably circular receiving opening 8, allows for a precise guidance of the plug halves 1, 2 in the radial direction. To keep the radial play as small as possible, the inner diameter $d_1$ of the receiving opening 8 is selected such that it is only slightly larger than the outer diameter $d_2$ of the main guide pin 6.

Within the circular contour of the receiving opening 8, non-shown axially extending grooves can be inserted which serve for collecting dirt during operation, which dirt is brought into the receiving opening 8 in particular through the main guide pin 6 and can accumulate in the grooves. Thereby, the dirt does not get between the walls of main guide pin 6 and receiving opening 8, which are in contact with one another, so that jamming of the components and premature wear are prevented.

The centering pins 7a, 7b have a tulip-shaped head 22 formed on their front end, the maximum outer diameter $d_4$ of which is formed only slightly smaller than the inner diameter $d_3$ of the receiving opening 9. Within the plug 1, the centering pins 7a, 7b have a smaller diameter and, over a large part of their axial length, are arranged spaced apart from the plug 1 by means of an annular space 18. The attachment of the centering pins 7a, 7b is carried out in the area of the rear bottom wall 16 and allows in particular on the front side 17 for the centering pins' 7a, 7b freedom of movement in the radial direction.

The range of movement of the centering pins 7a, 7b is limited by an elastic element 19 in the form of an O-ring. Due to the elastic properties of the mounting of the centering pins 7a, 7b, the distribution of the system-immanent play takes place in a uniform manner over both sides of the plug 1 or both centering pins 7a, 7b.

The different configurations of the line contacts shown in FIG. 2 are due to the different uses as electrical and pneumatic contacts.

Figure 3:
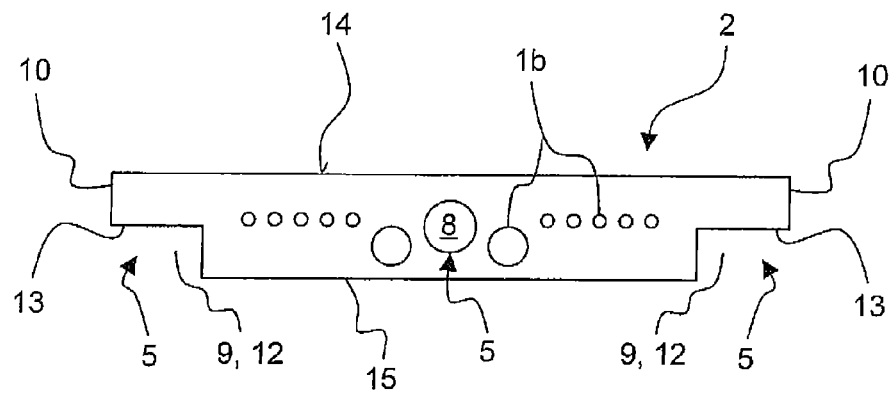

FIG. 3 shows a front view of a socket 2 with an alternative design of the receiving openings 9. The same are formed as recess 12 of the outer housing contour, wherein each recess 12 comprises a horizontally extending wall section 13 which is set back with respect to the lower side 15 of the socket 2. In the shown embodiment, the two recesses 12 open out into the lateral wall faces 10. However, the upper side of the socket 2 extends planarly up to the lateral wall faces 10. Moreover, the upper side 14 and the lower side 15 extend parallel to one another.

REFERENCE NUMBER LIST

1 Plug, first plug half
1a Line contacts, plug
1b Line contacts, socket
2 Socket, second plug half
3 Pivot wedge
4 Guide elements, plug
5 Guide elements, socket
6 Main guide pin
7a, b Centering pin
8 Receiving opening, main guide pin
9 Receiving opening, centering pin
10 Lateral wall face
11 Breakout
12 Recess
13 Horizontal wall section
14 Upper side, socket
15 Lower side, socket
16 Rear bottom wall, plug
17 Front side, plug
18 Annular space
19 Elastic element, O-ring
20 Main guide pin tip
21 King pin
22 Centering pin head
$d_1$ Inner diameter of receiving opening, main guide pin
$d_2$ Outer diameter, main guide pin
$d_3$ Inner diameter of receiving opening, centering pin
$d_4$ Outer diameter centering pin

The invention claimed is:

1. A plug-in system for trailer vehicles with an automatic coupling system of the supply lines, comprising a plug supporting the line contacts and a socket, wherein the plug has guide elements which actively engage when approaching the guide elements of the socket, wherein the guide elements comprise a main guide pin and at least one centering pin that is spaced apart therefrom, and wherein at least the centering pin and/or the associated guide element allows an elastic movement is elastic in the radial direction with respect to the main guide pin.

2. A plug-in system for trailer vehicles with an automatic coupling system of the supply lines, comprising a plug supporting the line contacts and a socket, wherein the plug has guide elements which actively engage when approaching the guide elements of the socket, wherein the guide elements comprise a main guide pin and two centering pins arranged on both sides of the main guide pin that are spaced apart therefrom, wherein at least the centering pin and/or the associated guide element is elastic in the radial direction.

3. The plug-in system according to claim 1 or 2, wherein the main guide pin and the at least one centering pin are dedicated to the plug.

4. The plug-in system according to claim 1 or 2, wherein the guide elements of the socket are formed as receiving openings.

5. The plug-in system according to claim 4, wherein the receiving opening provided for receiving the main guide pin has an inner diameter ($d_1$) which is complementary to the outer diameter ($d_2$) of the main guide pin.

6. The plug-in system according to claim 4, wherein the receiving opening provided for receiving the at least one centering pin is formed with an inner diameter ($d_3$) which is complementary to the outer diameter ($d_4$) of the at least one centering pin.

7. The plug-in system according to claim 6, wherein the receiving opening has a breakout to the respective nearest lateral wall face.

8. The plug-in system according to claim 4, wherein the receiving openings for the centering pins are formed from recesses of the socket which have a planarly extending horizontal wall section and which each are formed on the upper and/or lower side of the socket.

9. The plug-in system according to claim 8, wherein the recesses open out into the lateral wall faces.

10. The plug-in system according to claim 1 or 2, wherein the plug and the socket are made of plastic.

11. The plug-in system according to claim 1 or 2, wherein the main guide pin and the at least one centering pin are made of metal.

12. The plug-in system according to claim 1 or 2, wherein the main guide pin and the at least one centering pin extend in axial direction throughout the entire length of the plug.

13. The plug-in system according to claim 1 or 2, wherein the main guide pin and the at least one centering pin are attached to the rear bottom wall.

14. A plug-in system for trailer vehicles with an automatic coupling system of the supply lines, comprising a plug supporting the line contacts and a socket, wherein the plug has guide elements which actively engage when approaching the guide elements of the socket, wherein the guide elements comprise a main guide pin and at least one centering pin that is spaced apart therefrom, wherein at least the centering pin and/or the associated guide element is elastic in the radial direction, the at least one centering pin is surrounded within the plug by an annular space opening out on the front side and is supported with an elastic element just before the exit out of the annular space on the wall of the same.

15. The plug-in system according to claim 14, wherein the elastic element is an O-ring.

16. A first plug half according to claim 1 or 2 or 14, wherein the main guide pin protrudes further with respect to the front side than the at least one centering pin.

17. The plug-in system according to claim 1 or 2 or 14, wherein the plug is arranged on a pivot wedge which is formed complementary to the insertion opening of a fifth wheel.

18. A first plug half with guide elements which are formed thereon and which, when approached by guide elements of a second plug half, can actively engage with the same, wherein the guide elements comprise a main guide pin and at least one centering pin laterally spaced apart therefrom, wherein the at least one centering pin is elastic or elastically mounted in the radial direction, wherein the plugged state of plug and socket the range of movement is limited by the main guide pin to two degrees of freedom and lateral tolerances between the plug and the socket are compensated by an adequate deformaton.

* * * * *

UNITED STATES PATENT AND TRADEMARK OFFICE
CERTIFICATE OF CORRECTION

| | | |
|---|---|---|
| PATENT NO. | : 8,187,020 B2 | |
| APPLICATION NO. | : 12/921924 | |
| DATED | : May 29, 2012 | |
| INVENTOR(S) | : José Manuel Algüera Gallego | |

It is certified that error appears in the above-identified patent and that said Letters Patent is hereby corrected as shown below:

Column 6, Line 2:

Delete "is elastic" after "movement".

Signed and Sealed this
Seventeenth Day of July, 2012

David J. Kappos
*Director of the United States Patent and Trademark Office*